United States Patent
Lee et al.

(10) Patent No.: US 10,670,083 B2
(45) Date of Patent: Jun. 2, 2020

(54) WEDGE CLUTCH WITH WEDGE CHAIN

(71) Applicant: SCHAEFFLER TECHNOLOGIES AG & CO. KG, Herzogenaurach (DE)

(72) Inventors: Brian Lee, York, SC (US); Carsten Ohr, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 5 days.

(21) Appl. No.: 16/139,221

(22) Filed: Sep. 24, 2018

(65) Prior Publication Data

US 2020/0096052 A1  Mar. 26, 2020

(51) Int. Cl.
- *F16D 13/18* (2006.01)
- *F16D 11/16* (2006.01)
- *F16D 23/12* (2006.01)

(52) U.S. Cl.
CPC ............. *F16D 13/18* (2013.01); *F16D 11/16* (2013.01); *F16D 2023/123* (2013.01)

(58) Field of Classification Search
CPC .......... F16D 13/14; F16D 13/16; F16D 13/18; F16D 15/00; F16D 23/12; F16D 2023/123; F16D 11/16; F16D 41/063; F16D 41/0825
See application file for complete search history.

(56) References Cited

U.S. PATENT DOCUMENTS

| | | | |
|---|---|---|---|
| 5,067,598 A | 11/1991 | Ritter et al. | |
| 5,520,268 A * | 5/1996 | Li | F16D 41/07 188/82.8 |
| RE38,012 E | 3/2003 | Ochab et al. | |
| 9,115,768 B2 | 8/2015 | Sturgin | |
| 9,518,643 B2 | 12/2016 | Schimpf et al. | |
| 2013/0118851 A1* | 5/2013 | Nelson | F16D 15/00 192/45.1 |
| 2014/0335992 A1 | 11/2014 | Lee et al. | |
| 2017/0114871 A1 | 4/2017 | Linton | |
| 2018/0073575 A1* | 3/2018 | Hixenbaugh | F16D 13/16 |

FOREIGN PATENT DOCUMENTS

| | | |
|---|---|---|
| DE | 10084985 T1 | 12/2002 |
| DE | 102013220224 A1 | 10/2014 |
| DE | 102013108030 A1 | 2/2015 |
| EP | 0391084 A | 10/1990 |
| GB | 2372524 B | 3/2004 |
| WO | 2017211340 A1 | 12/2017 |

\* cited by examiner

*Primary Examiner* — Jacob S. Scott
*Assistant Examiner* — Lori Wu
(74) *Attorney, Agent, or Firm* — Brooks Kushman P.C.

(57) ABSTRACT

A wedge clutch includes an inner race and an outer race. The outer race defines an inner cam surface. A chain of wedges encircles the inner race and are configured to couple the races when the clutch is engaged. The wedges have outer surfaces that match with sections of the inner cam surface such that the wedges have an outer radial position when in first rotational position relative to the cam surface and have an inner radial position when in a second rotational position to frictionally engage the inner race.

19 Claims, 9 Drawing Sheets

US 10,670,083 B2

WEDGE CLUTCH WITH WEDGE CHAIN

TECHNICAL FIELD

The present disclosure relates to clutches configured to couple rotating members, and more specifically to clutches that include a wedge element.

BACKGROUND

A clutch is a component used to selectively couple two or more components such as rotatable shafts. The clutch may be engaged to couple the components and may be disengaged to decouple the components. Many types of clutches are known. One type of clutch is a wedge clutch. A wedge clutch may include an inner race connected to a shaft and an outer race connected to another shaft. A wedge plate is radially disposed between the inner and outer races and is configured to couple the inner and outer races when the clutch is engaged to transmit power from one shaft to another.

SUMMARY

According to one embodiment, a wedge clutch includes an inner race and an outer race. The outer race defines an inner cam surface. A chain of wedges encircles the inner race and are configured to couple the races when the clutch is engaged. The wedges have outer surfaces that match with sections of the inner cam surface such that the wedges have an outer radial position when in first rotational position relative to the cam surface and have an inner radial position when in a second rotational position to frictionally engage the inner race.

According to another embodiment, a wedge clutch includes an inner race, an outer race, and an annular wedge assembly radially disposed between the inner and outer races. The wedge assembly is configured to selectively couple the races and includes a plurality of segments circumferentially arranged around the inner race. Each segment has a pair of first and second wedge stacks interconnected to each other by a first link, and each of the wedge stacks has multiple wedges that are axially spaced relative to each other. A plurality of second links are each connected between adjacent ones of the segments to interconnect the segments to form a chain.

According to yet another embodiment, a clutch includes an inner race defining at least one groove and an outer race defining an inner cam surface. A wedge chain is radially disposed between the inner and outer races. The wedge chain includes a plurality of wedges disposed in the at least one groove and interconnected with links to encircle the inner race. Each of the wedges have an outer surface that cooperates with the cam surface to increase and decrease friction between the wedge and the at least one groove in response to circumferential movement of the wedge relative to the cam surface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many vehicles and other applications require selective coupling of two or more members such as shafts, gears, transmissions, torque converters, electric motors, and the like. A clutch is a mechanism configured to selectively couple two or more members. The clutch may couple a pair of rotating members, or may couple a rotating member to a stationary member, in which case the clutch is commonly referred to as a brake. In one example application, the clutch may be used in a hybrid vehicle to disconnect an internal-combustion engine from a hybrid transmission. Of course, the clutch may be used in a variety of other applications such as in a stator of a torque converter.

Figure 1:
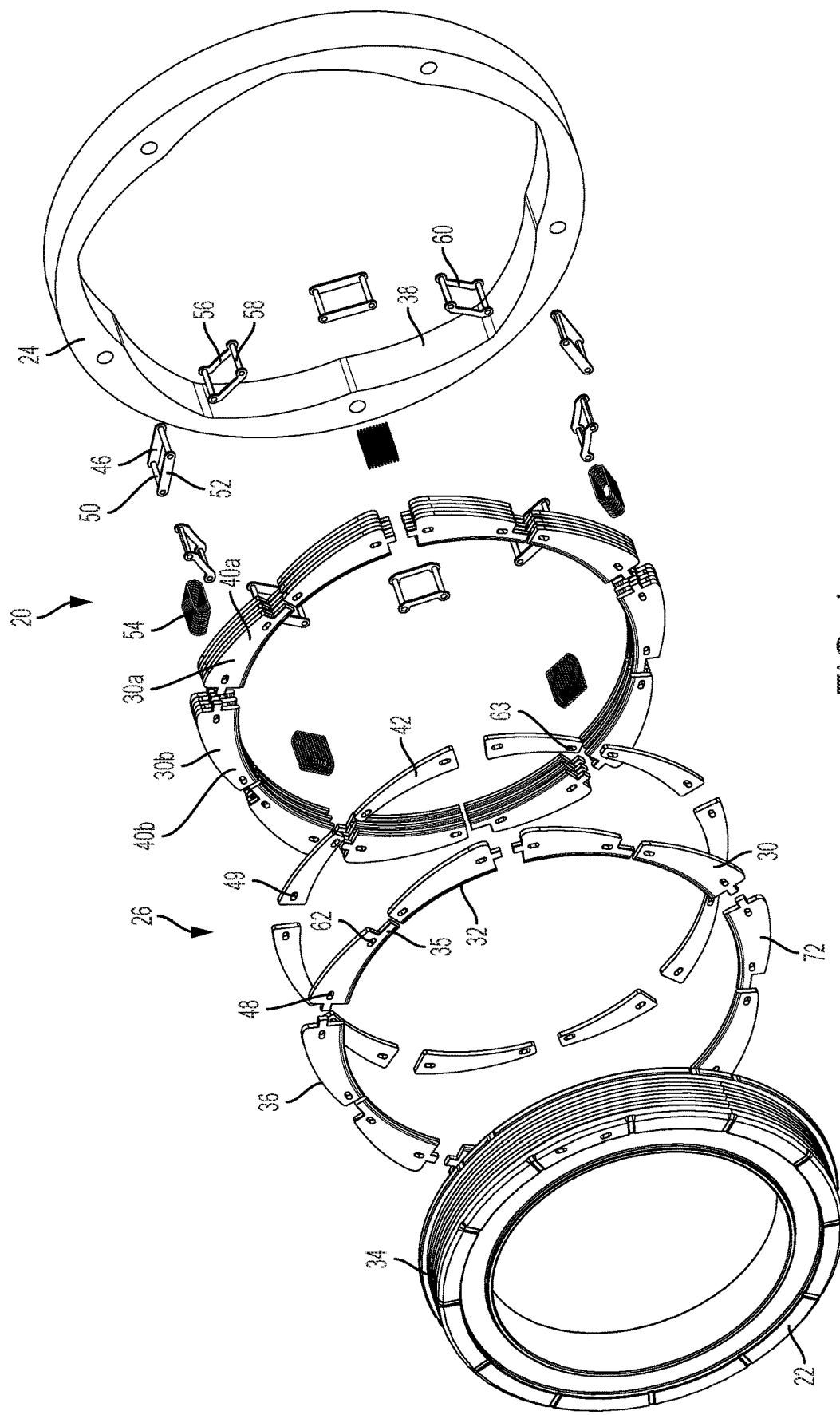
FIG. 1 is an exploded perspective view of a wedge clutch.
Figure 2:
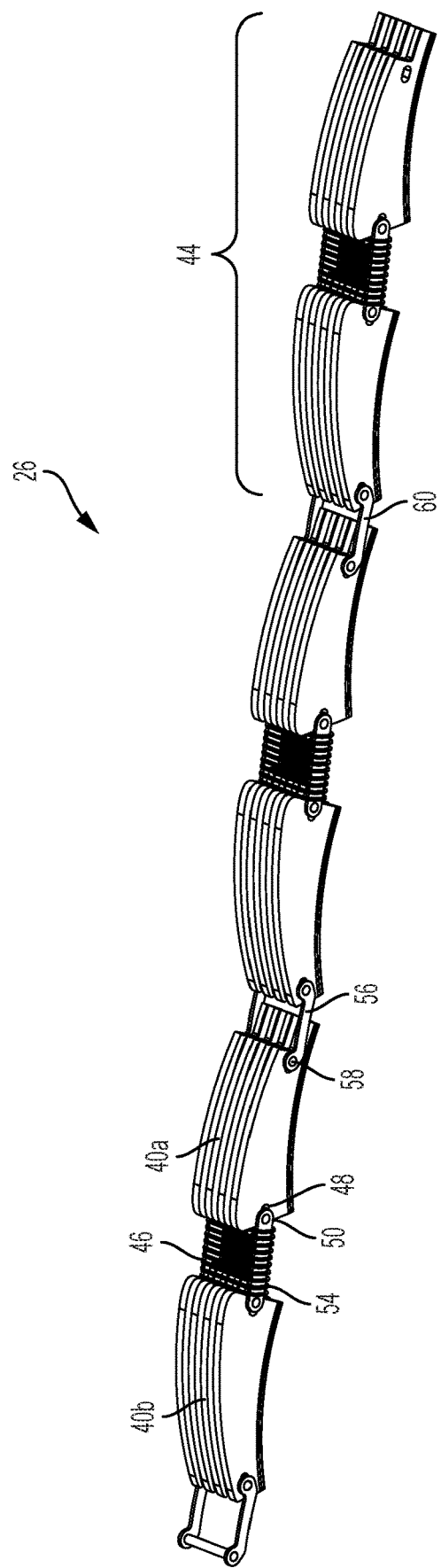
FIG. 2 is a perspective view of a wedge chain of the wedge clutch.

Referring to FIGS. 1 and 2, a clutch 20, which is known as a wedge clutch, may be used to couple two or more components. The clutch 20 includes an inner race 22 (also known as a hub) and an outer race 24 (also known as a carrier). A wedge assembly 26 is radially disposed between the inner and outer races 22, 24 and is configured to selectively couple the races. The clutch 20 may include a plurality of modes that couple and decouple the races 22, 24 in a variety of relative directions of rotation. For example, the clutch 20 may include a fully locked mode (also known as lock-lock mode) in which the races 22, 24 are coupled in both rotational directions and at least one one-way mode (also known as lock-free mode) in which the races 22, 24 are coupled in a first rotational direction and are decoupled, i.e., overrun, in a second rotational direction that is opposite the first. The clutch 20 may include two one-way modes so that the overrunning direction can be switched to suit current operating conditions and may include an unlocked mode (also known as open mode) in which the races 22, 24 are completely decoupled. The clutch 20 may be biased to the fully locked mode, a one-way mode, or an unlocked mode. The specific modes offered, and the bias of the clutch, can be modified to suit specific applications. The hardware illustrated in FIG. 1 is capable of offering all of the above described modes when suitably combined with the correct actuator and control logic.

The clutch 20 may be supported in a housing (not shown) that is attachable to a support structure such as a vehicle chassis or other fixed member. The inner and outer races 22, 24 may be supported for concentric rotation within the housing. The housing may define a seat that receives a roller bearing that in turn supports the outer race 24 for rotation within the housing. The outer race 24 may be connectable to a rotating member, or alternatively a stationary member, via a spline connection, fasteners, press-fit, or the like. Similarly, the inner race 22 is connectable to a rotating member, or alternatively a stationary member, via spline connection, fasteners, press-fit, or the like.

A wedge assembly 26 includes a plurality of individual wedges 30 that cooperate to couple and decouple the inner and outer races 22, 24. The wedges 30 may be generally arcuate as shown in the illustrated embodiment. To facilitate manufacturability of the clutch 20, the individual wedges 30 may be assembled as a chain. Assembling the wedge assembly 26 as a chain holds the individual wedges 30 in place while the wedge assembly 26 is installed on the inner and outer races. The chain 26 is wrapped around the inner race 22 to place the wedges 30 circumferentially around the inner race 22.

Each wedge 30 has a circular inner diameter 32 that substantially matches the outer diameter 34 of the inner race 22 and an outer surface 36 that is ramped, to conform with the shape of an inner cam surface 38 formed on the outer race 24, causing the wedges 30 to taper in height along the arcuate direction of the wedge 30. In the illustrated embodiment two types of wedges 30a and 30b are used, but in other embodiments, each of the wedges may be the same. The wedges 30a and 30b may be similar except that wedges 30a include a tail 35. Like wedges are arranged with each other in wedge stacks. For example, four wedges 30a are grouped together to form a wedge stack 40a and four wedges 30b are grouped together to form a wedge stack 40b. Spacers 42 are placed between the wedges in the wedge stacks to axially space the wedges from each other. In the illustrated embodiment, three spacers are in each wedge stack 40a, 40b. The wedge stacks may include more or less wedges and spacers in other embodiments.

The wedge stacks 40a, 40b are installed in the clutch in either a first orientation or a second orientation that is mirrored relative to the first orientation. (The first and second orientations are mirrored over a radially extending line.) Each of the wedge stacks 40a may be in the same orientation, and each of the wedge stacks 40b may be in the same orientation.

The wedge stacks 40a, 40b are arranged in pairs that form segments 44 of the chain 26. Each segment 44 includes a wedge stack 40a that is in the first orientation and a second wedge stack 40b that is in the second orientation. The wedge stacks 40a may be referred to as a first set and the wedge stacks 40b may be referred to as a second set. The first and second sets of wedge stacks alternate along the length of the chain 26 and around the circumference of the inner race 22 when installed.

The stacks 40a, 40b of each pair are connected to each other by a link 46. The links 46 are designed to allow a certain degree of movement between the wedge stacks. For example, the links 46 may allow pivotal and circumferential movement between the stacks 40a, 40b. The links 46 may include pins 50 that extend through slots 48 defined in the wedges 30 and the slots 49 of the spacers 42. Side plates 52 of the links 46 interconnect the pins 50. The slots 48 may be elongated in the circumferential direction to facilitate the circumferential movement of the wedges 30. A resilient member 54 may be disposed between the stacks 40a, 40b of each segment 44 to bias the stacks away from each other. In the illustrated embodiment, the resilient members 54 may be springs that are received over the links 46. Thus, the links 46 may be referred to as spring links.

The segments 44 may be joined together by links 56. The links 56 may be similar to the links 46 and include pins 58 that are received through slots 62 defined in the wedges 30, slots 63 in the spacers, and side plates 60 that interconnect the pins 58. The links 56 allow the segments 44 to move relative to each other. For example, the pin connection allows the segments 44 to pivot relative to each other and the slots 62 may be elongated in the circumferential direction allowing the segments 44 to move circumferentially relative to each other. The side plates 60 are designed to allow a finger of an actuator to be received between the segments 44. Thus, the links 56 may be referred to as actuator links. A middle portion of the side plates 60 may dip radially inward providing clearance for the finger. (Example actuation will be described below in more detail.)

Figure 3:
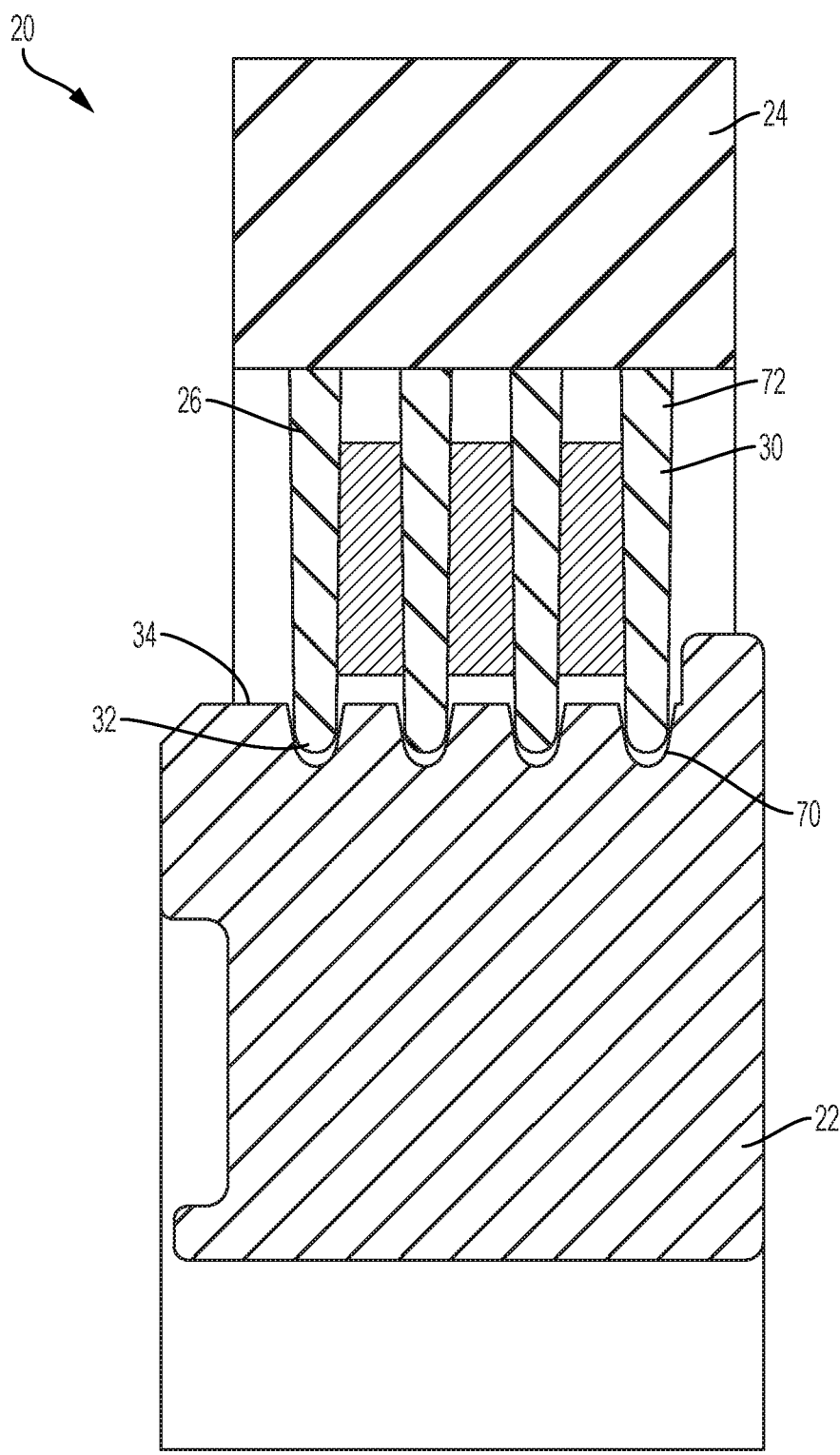
FIG. 3 is a cross-sectional view of the wedge clutch.

Referring to FIG. 3, the inner race 22 may have a plurality of axially spaced circular grooves 70 defined in the outer diameter 34. The grooves 70 are spaced to match the axial spacing of the wedges 30 in the wedge stacks 40a, 40b. Each of the grooves 70 receives a corresponding one of the rows 72 of wedges of the chain 26. That is, the chain 26 is wrapped around the outer diameter 34 so that the inner surfaces 32 of the wedges 30 are received within the grooves 70. The grooves 70 and the inner surfaces 32 are designed to frictionally lock with each other when the clutch 20 is engaged.

Figure 4:
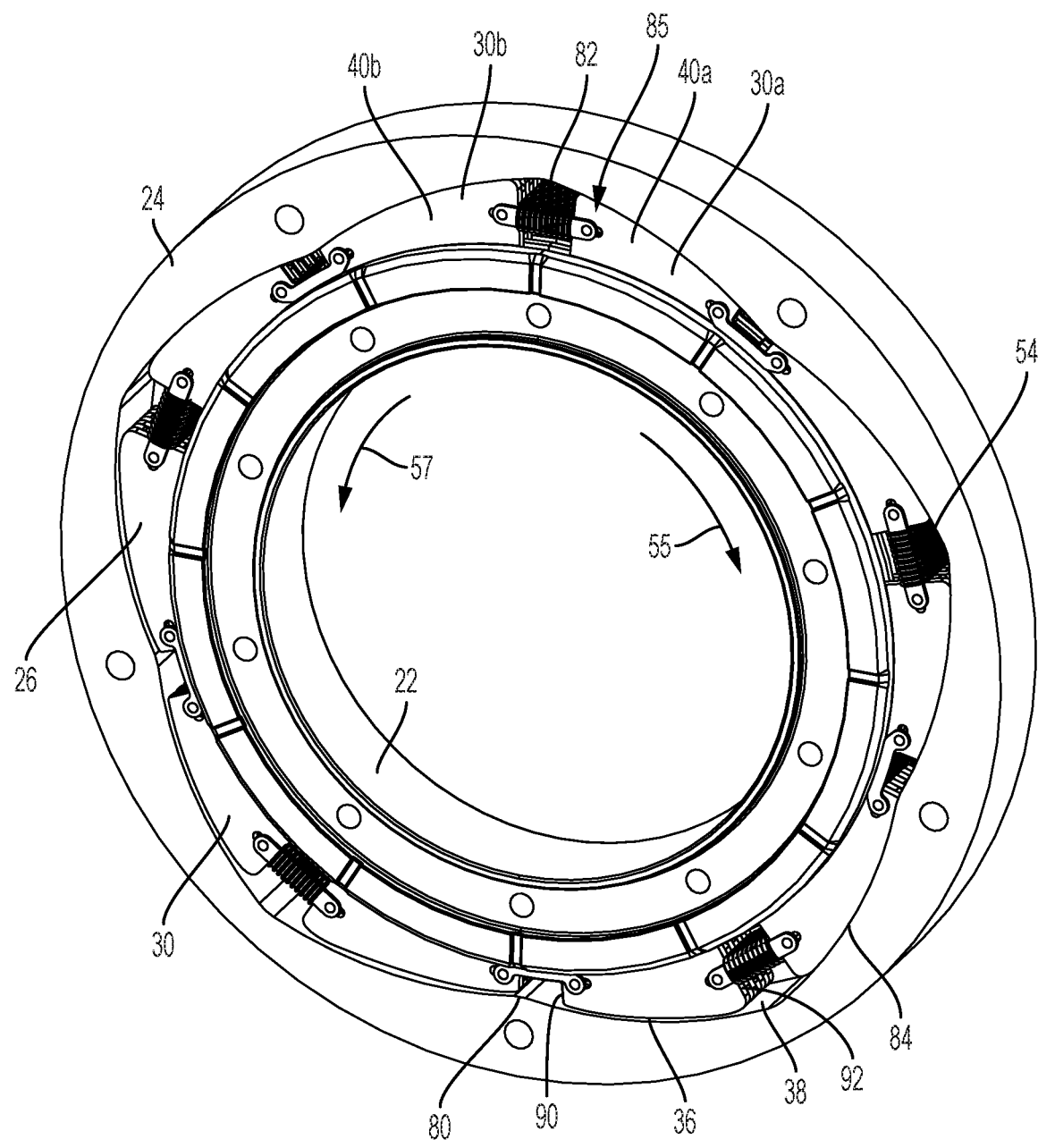
FIG. 4 is a perspective view of the wedge clutch.

Referring to FIG. 4, the inner cam surface 38 includes lobes 80 and valleys 82 interleaved with the lobes 80. The lobes 80, are the inner-most portion of the cam surface 38 and the valleys 82 are the outer-most portion of the cam surface 38. Ramps 84 each extend between adjacent ones of the lobes 80 and the valleys 82. Each set of ramps, lobes, and valleys collectively defines a generally wedge-shaped pocket 85 in the outer race 24 for receiving one of the wedge stacks 40a, 40b.

Each of the wedge stacks 40a, 40b is seated in one of the pockets 85 with the outer surface (outer edge) 36 facing a ramp 84, a short end 90 facing a lobe 80, and a tall end 92 facing a valley 82. The outer surface 36 is ramped to match the ramps 84 so that the wedges 30 can slide along the inner cam surface 38. The wedges 30 may be biased towards the lobes 80 via the springs 54 so that the clutch 20 is in the fully locked mode by default.

The clutch 20 operates by wedging the wedges 30 into the inner race 22 to create a friction coupling. The wedges 30 may be biased toward the lobes 80 by the resilient members 54. This creates friction between the wedges 30 and the inner race 22, which causes the wedges 30 to decelerate relative to the outer race 24 and further slide in a wedging direction of the cam surface 38 when power is applied to the clutch 20. That is, at least some of the decelerating wedges 30 ride down the ramps 84 increasing the friction between the wedges 30 and the inner race 22 to create a friction coupling sufficient to lock the inner and outer races 22, 24. The cam surface 38 is shaped so that the wedges 30 cannot pass over the lobes 80 to lock the outer race 24 to the wedge assembly 26. This creates a power flow path through the clutch 20 so that power can be selectively transferred between the components attached to the races 22, 24.

The wedge stacks 40a and 40b cooperate with the inner cam surface 38 to selectively couple the inner and outer races 22, 24 depending upon the positions of the wedge stacks 40a and 40b on the inner cam surface 38. The chain 26 is configured to allow movement between the wedge stacks allowing the different sets of stacks 40a, 40b to be in different locations on the cam surface 38. Each set of the wedge stacks may be responsible for coupling the inner and outer races 22, 24 in one of the rotational directions. For example, the first set of wedge stacks 40a can prevent the inner race 22 from rotating in a first direction 55 relative the outer race 24 and the second set of wedges 40b can prevent the inner race 22 from rotating in a second direction 57 relative the outer race 24 depending upon the location of the wedge stacks on the inner cam surface 38.

The wedge stacks 40a, 40b may be controlled by an actuator (not shown). A variety of different actuators may be used including electromagnetic, hydraulic, and mechanical. The actuator may include fingers that are disposed between the segments 44. The fingers may be mounted to a disk and included as part of the clutch 20. The disk may be rotated relative to the outer race 24 to circumferential move associated wedge stacks via the fingers to engage and disengage the wedge stacks with the inner race 22. Applicant's U.S. patent application Ser. No. 16/050,782, filed Jul. 31, 2018, describes examples of this type of actuator and is incorporated in its entirety by reference herein.

Another type of actuator may include variable-width fingers disposed between the segments 44. The fingers may be moved axial to adjust the circumferential position of the wedge stacks to engage and disengage the clutch. Applicant's U.S. patent application Ser. No. 16/037,457, filed Jul. 17, 2018 describes examples of this type of actuator and is incorporated in its entirety by reference herein.

An example will now be described to explain operation of the clutch 20 in the fully locked mode. Assume that the outer race 24 is attached to the driving shaft and the inner race 22 is attached to the driven shaft. The wedges 30a prevent the inner race 22 from rotating in the first direction 55 relative to the outer race 24 as the drag force between the wedges 30a and the inner race 22 causes the ramps 84 and the outer surface 36 to ride up each other to create sufficient friction between the wedges 30a and the inner race 22 to lock the inner race 22 to the outer race 24. Similarly, the wedges 30b prevent the inner race 22 from rotating in the second direction 57 relative to the outer race 24. Thus, the wedge stacks 40a and 40b cooperate to lock the inner race 22 to the outer race 24 in both directions.

Continuing with the above example, the clutch 20 may be switched from the fully locked mode to a one-way mode by circumferentially moving one set of the wedge stacks towards the valley's 82. For example, driving the wedge stacks 40b towards the valleys 82 decreases or eliminates the friction between the wedges 30b and the inner race 22 so that the inner race 22 can overrun in the second direction 57. A second one-way mode can be achieved by releasing the driving wedge stacks 40b and driving the wedge stacks 40a towards the valleys 82 to decrease or eliminate the friction between the wedges 30a and the inner race 22 so that the inner race 22 can overrun in the first direction 55.

The clutch 20 may be fully disengaged by moving the wedge stacks 40a, 40b towards the valleys 82 to reduce the friction force between the wedges 30a, 30b and the inner race 22 to a nominal amount.

One of many ways to increase torque capacity of the of the clutch 20 is to increase or decrease the number of wedge rows of the wedge assembly 26. In the above illustrated embodiment, the wedge assembly 26 included four rows of wedges, which is suitable for relatively high-torque applications. For lower-torque applications, the number of rows can be reduced to two or in some instances one.

Figure 5:
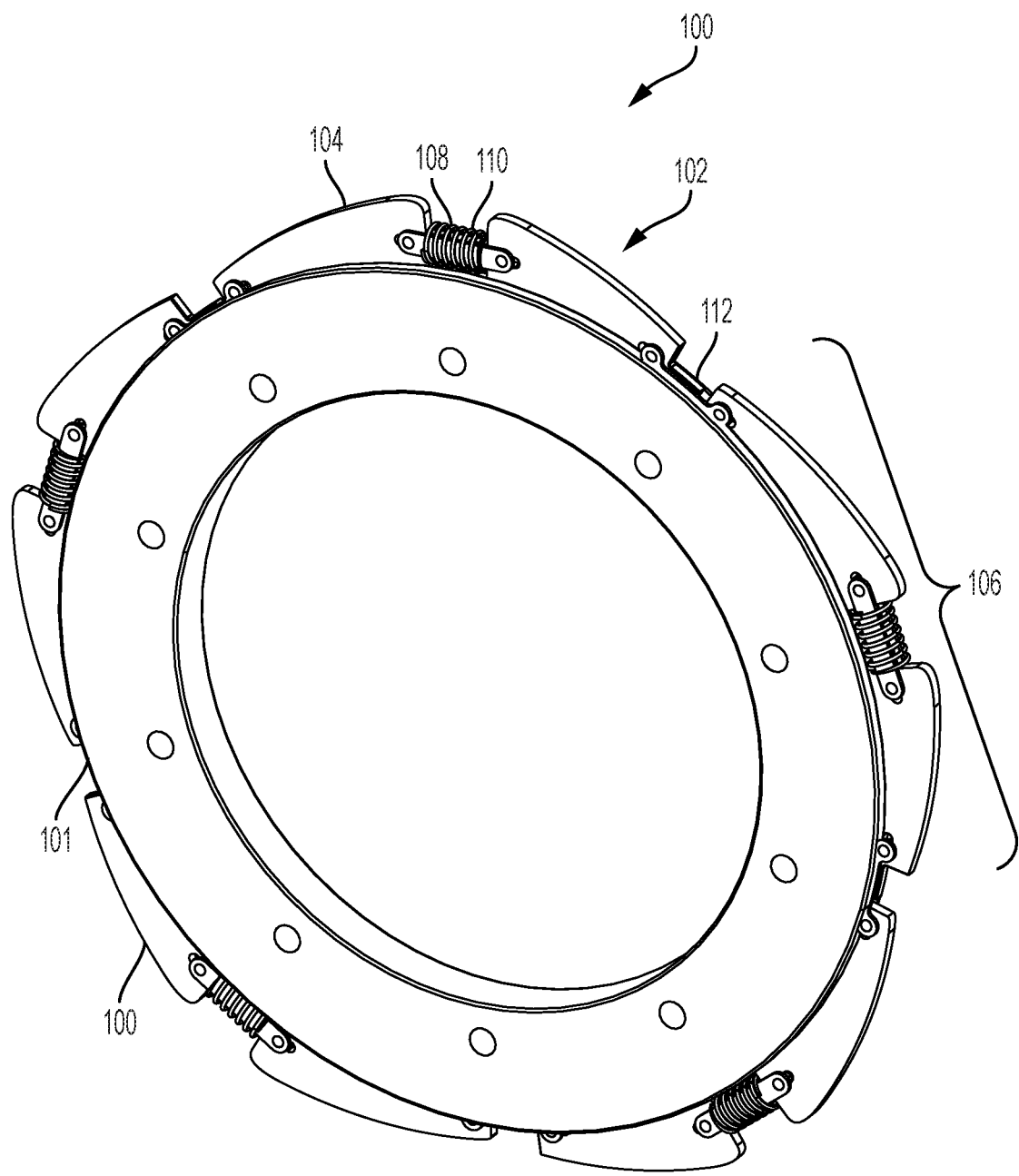
FIG. 5 is a partial perspective view of another wedge clutch according to an alternative embodiment.

FIG. 5 illustrates a lighter-duty clutch 100 that has a single row of wedges. The clutch 100 may include an inner race 101 and a wedge assembly (wedge chain) 102. The wedge assembly 102 includes a plurality of wedges 104 that may be the same or similar to the wedges 30. The wedges 104, like above, are arranged in mirrored pairs to form segments 106. The wedges 104 of each pair are joined together by a link 108. The links 108 may be similar to the above-described links except designed to connect single wedges as compared to wedge stacks. Springs 110 may be disposed over the links 108 to bias the wedges 104 of each pair away from each other. Also like above, the wedge segments 106 may be joined together by links 112 to form a chain having a single row of wedges 104. The inner race 101 may define a single circular groove in the outer diameter that receives an inner surface of the wedges 104.

The remaining components of the clutch may be like the clutch 20 albeit modified to match the axial thickness of the single row chain 102. The wedge clutch 100 may operate in the same manner described above.

The above-described clutches and wedge chains may be manufactured and assembled in many different ways. Below are example methods for assembling the wedge chains and wedge clutches. The below methods are merely examples and are not an exhaustive list of suitable manufacturing processes.

Figure 6:
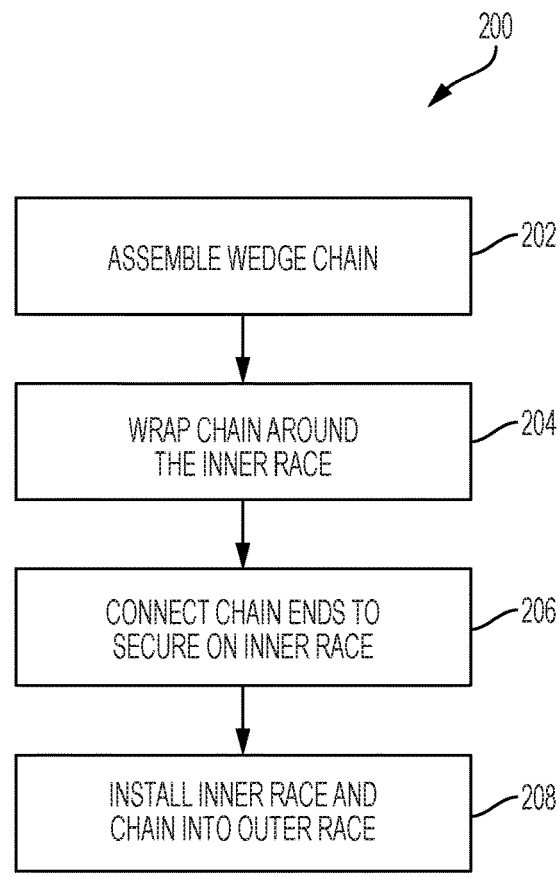
FIG. 6 is a flow chart illustrating a method of assembling a wedge clutch.
Figure 7:
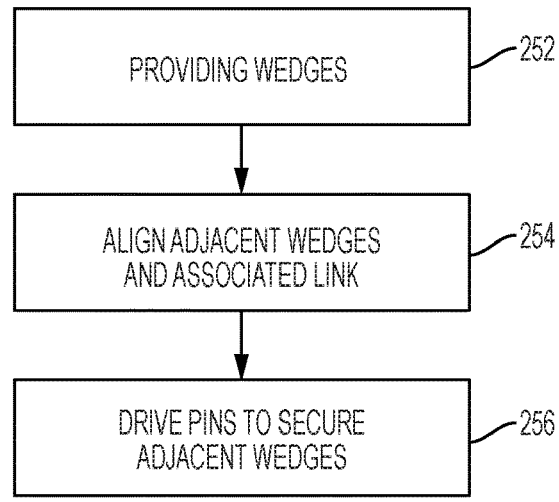
FIG. 7 is a flow chart illustrating a method of assembling a wedge chain.

Referring to FIG. 6, a method 200 of assembly generally includes assembling a wedge chain by connecting a plurality of wedges together with links such that the wedges are movable relative to each other at step 202. At step 204, the wedge chain is wrapped around an inner race. The ends of the chain are connected at step 206 to secure the chain to the inner race. The inner race may define one or more circular grooves that partially receive the wedges of the chain. FIG. 5 shows an example subassembly after step 206. The ends may be connected by securing an end one of the links to an end one of the wedges. The end one of the links may be an ordinary link, or in some embodiments, a master link may be used. A master link is a quick-release link that allows for convenient connection and disconnection of the chain. Master links may be designed to be connected/disconnected without the need for special tools. At step 208, the inner race is installed into an outer race with the wedge chain being radially disposed between the races. The inner race may be installed by aligning the wedge chain with an inner cam surface of the outer race and then inserting the inner race and the wedge chain into the outer race so that the wedges nest with the inner cam surface. FIG. 4 shows an example clutch after step 208. After step 208, the core components of the clutch have been assembled. Additional components, such as actuators, shafts, housings, and the like, may then be assembled to the core components to complete clutch assembly.

Referring to FIGS. 7 through 10, a method 250 of assembling a single-row wedge chain 240 will be described according to one embodiment. At step 252 a plurality of wedges are provided. The wedges may include a first type of wedges 212 and a second type of wedges 214. The wedges may be the same or similar as wedges 30a and 30b described above. In some embodiments, the wedges may all be the same type. The wedges may be formed from a metal alloy and may be manufactured using a stamping process or other known technique. The slots 216, 218 may be formed during the stamping process or may be formed in a secondary operation. The wedges 212, 214 may be manufactured by the entity that produces the wedge chain or by another entity.

Figure 8:
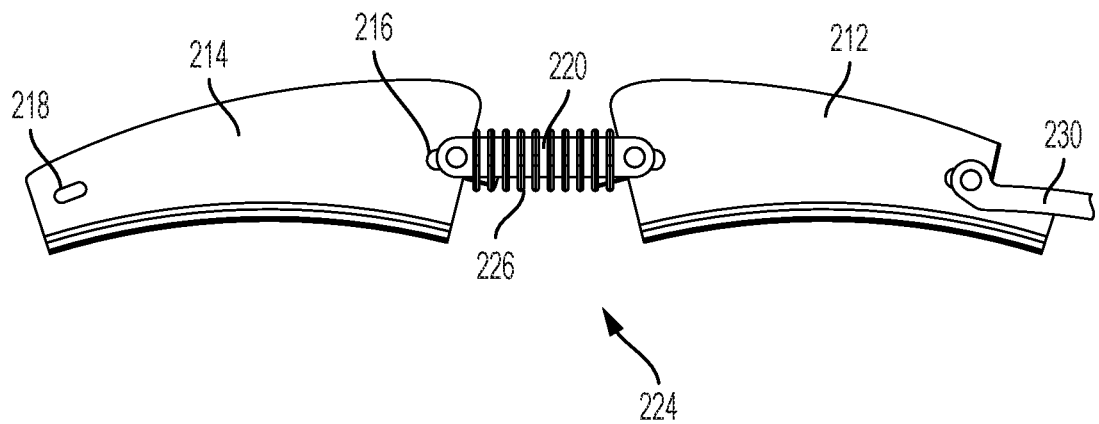
FIG. 8 is a side view showing an assembly step of the method of FIG. 7 in which a pair of wedges are aligned with a link.
Figure 9:
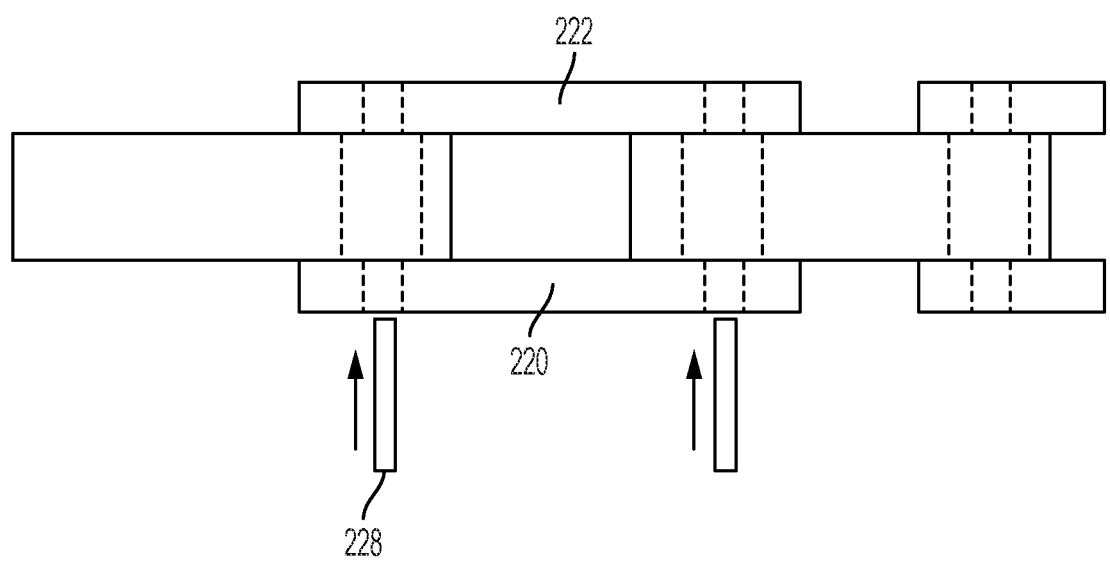
FIG. 9 is a diagrammatical top view showing an assembly step of the method of FIG. 7 in which pins are driven into the pair of wedges of FIG. 8.

A chain of wedges may be assembled by loading a plurality of wedges, links, and other components into one or more tools that sequentially attach adjacent wedges to each other to build the chain in a linear process. At step 254, a pair of wedges may be positioned adjacent to each other with the wedges being in a mirrored orientation as shown in FIG. 8. Side plates 220, 222 of a link 224 are aligned with the wedges 212, 214 so that holes of the side plates 220, 222 are aligned with the slots 216. A resilient member 226, such as a coil spring, may be disposed over the side plates 220, 222 to engage between the wedges 212, 214. Pins 228 are driven through the side plates and the wedges to fully form the link 224 and secure the pair of wedges 212, 214 to each other at operation 256 as shown in FIG. 9. This process may be repeated with successive wedges and links to form a chain of desired length. In the illustrated embodiment of FIG. 10, the chain includes two types of links, the above-described links 224 that include a resilient member and a second type of link 230 that does not include a resilient member. The links 224 and 230 may be the same or similar to the above-described links 46 and 56. This is but one example process for assembling a wedge chain and others are contemplated. For example, the links may be partially assembly as a side plate with two projecting pins. A pair of wedges may be assembled to the link by inserting the pins into their respective slots. A second side plate may then be secured to the pins to close the link and fully attached the pair of wedges. This process may be repeated to build a chain of desired length.

Figure 10:
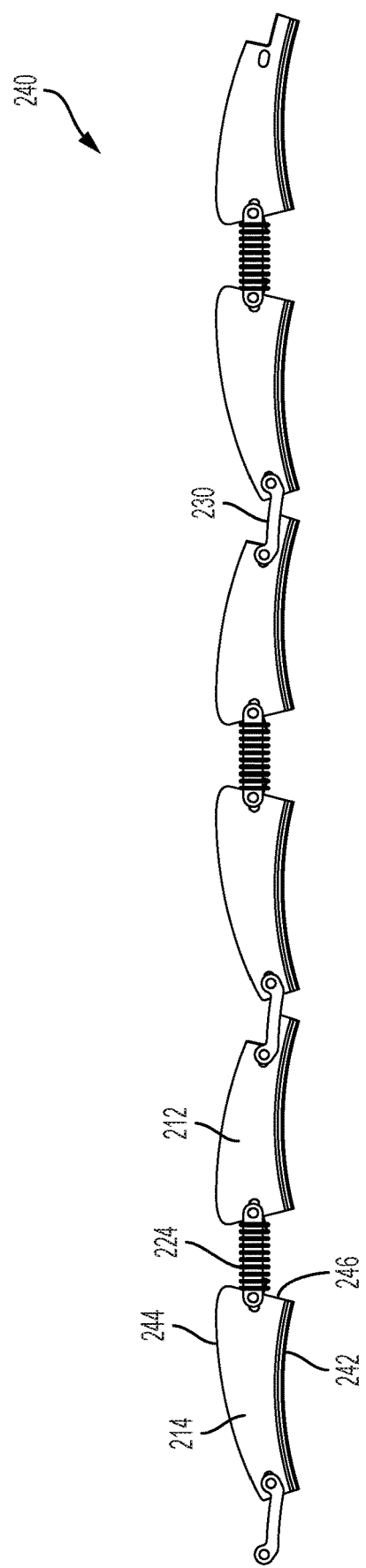
FIG. 10 is a side view showing a completed chain assembled according to the method of FIG. 7.

Referring to FIG. 10, the chain 240 is assembled with circular inner edges 242 of the wedges 212, 214 all facing in the same direction and the outer ramped edges 244 all facing the same direction so that all of the inner edges 242 are received on the inner race and all of the ramped edges engage with the outer race when the chain 240 is installed. The outer ramped edges 244 collectively define a discontinuous outer cam surface of the chain 240 when wrapped around the inner race. The discontinuous outer ramped surface conforms in shape with the inner cam surface of the outer race. The orientations of the wedges 212, 214 alternate along a length of the chain 240 such that placements of the tall ends 246 and the short ends 248 of adjacent ones of the wedges are flipped.

Figure 11:
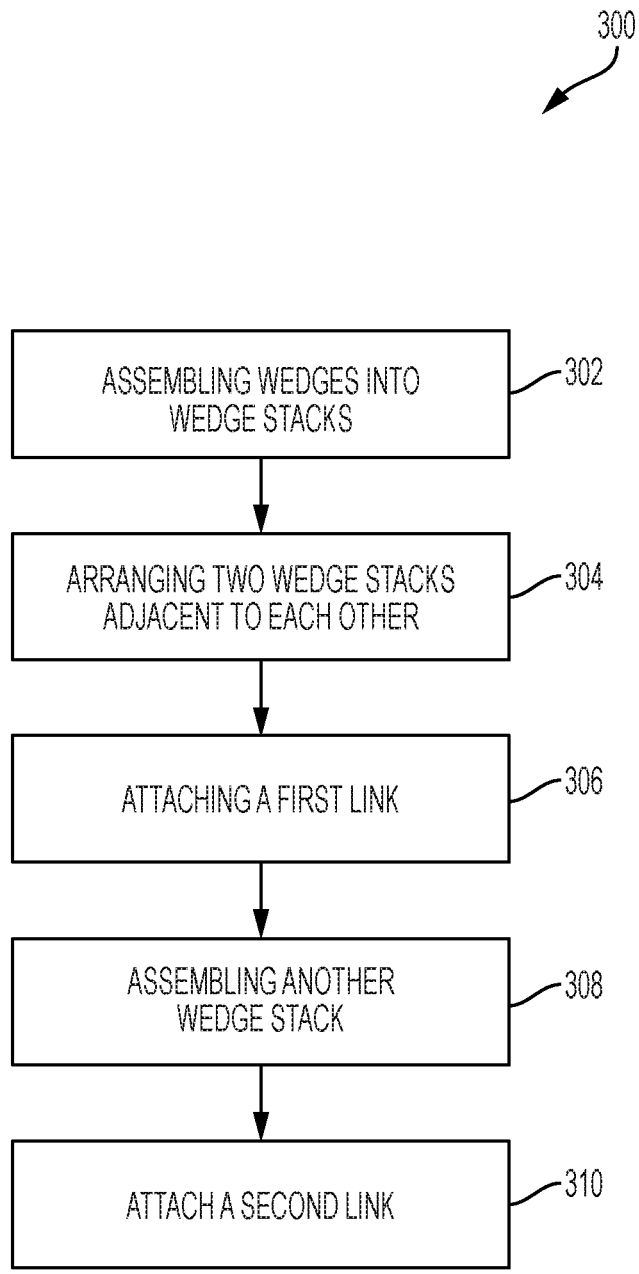
FIG. 11 is a flow chart illustrating a method of assembling a wedge chain according to an alternative embodiment.

Referring to FIG. 11, a method 300 of assembling a multi-row wedge chain (such as that depicted in FIG. 2) will now be described. Similar to the single-row chain 240, the multi-row wedge chain may be assembled by loading at least a plurality of wedges, links, spacers, and pins and sequentially assembling and attaching wedge stacks to each other. At step 302, a plurality of wedges and a plurality of spacers may be assembled into at least two wedge stacks so that spacers alternate with the wedges in an axial direction of the clutch (width direction of chain). At least two of the wedge stacks are arranged adjacent to each other in a mirrored orientation at step 304. At step 306, a first link is attached between the adjacent wedge stacks. The first link may include a resilient member and have a structure similar to the link 46 described above. The first link may be attached to the wedge segments by aligning side plates of the link with the wedge segments and spacers, and driving pins therethrough similar to the method 250. At step 308 another wedge stack may be assembled and then attached to the chain by a second link at step 310. This process is repeated until a desired number of wedge stacks are assembled onto the chain. FIG. 2 illustrates one example embodiment of a wedge chain (wedge assembly) produced using the method 300. In the illustrated embodiment the first and second links are different types of links, but in other embodiments the chain may only include a single type of link.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

20 Clutch
22 inner race
24 outer race
26 wedge assembly (chain)
30 wedges
30a wedge
30b wedge
32 inner surface
34 outer diameter
35 tail
36 outer surface
38 inner cam surface
40a, 40b wedge stacks
42 spacers
44 segments
46 spring links
48 slots
49 slots
50 pins
52 side plates
54 spring
56 actuator links 58 pins
60 side plates
62 slots
63 slots
70 grooves
72 rows
80 lobes
82 valleys
84 ramps
90 short end
92 tall end
100 clutch
102 wedge assembly
104 wedges
106 segments
108 links
110 springs
112 links

What is claimed is:

1. A wedge clutch comprising:
an inner race;
an outer race defining an inner cam surface; and
a chain of wedges including segments each having a pair of the wedges joined together by a first type of link, the chain further including a second type of links that interconnect the segments, wherein the chain encircles the inner race and is configured to couple the races when the clutch is engaged, the wedges having outer surfaces that match with sections of the inner cam surface such that the wedges are in an outer radial position when in a first rotational position relative to the cam surface and are in an inner radial position when in a second rotational position relative to the cam surface, wherein the wedge clutch is engaged when in the second rotational position and is disengaged when in the first rotational position.

2. The wedge clutch of claim 1, wherein the wedges of each segment are in a mirrored orientation relative to each other.

3. The wedge clutch of claim 1, wherein the first type of link includes a resilient member that basis-biases the wedges of the pair away from each other.

4. The wedge clutch of claim 1, wherein the wedges are movable relative to each other in a circumferential direction.

5. The wedge clutch of claim 1, Wherein each of the wedges defines at least one slot generally elongated in a circumferential direction of the clutch, and wherein the first and second types of links have pins disposed in the slots.

6. The wedge clutch of claim 1, Wherein the inner race defines at least one circular groove, and the wedges are partially received in the at least one groove.

7. The wedge clutch of claim 1, wherein the wedges are arranged in a plurality of wedge stacks that are circumferentially arranged around the inner race, each wedge stack including at least two of the wedges that are axially spaced relative to each other.

8. The wedge clutch of claim 1, wherein the wedges include a first set of wedges and a second set of wedges that alternate circumferentially around the inner race.

9. A wedge clutch comprising:
an inner race;
an outer race; and
an annular wedge assembly radially disposed between the inner and outer races and configured to selectively couple the races, the wedge assembly including:
a plurality of segments circumferentially arranged around the inner race, each segment having a pair of first and second wedge stacks interconnected to each other by a first link, wherein each of the wedge stacks has multiple wedges that are axially spaced relative to each other, and
a plurality of second links that are each connected between adjacent ones of the segments to interconnect the segments to form a chain.

10. The clutch of claim 9, wherein each of the first links includes pins on opposing ends of the link, and each of the wedges defines a first slot that receives one of the pins therein, wherein the slots are elongated in a circumferential direction of the clutch so that the wedge stacks are circumferentially movable relative to each other.

11. The clutch of claim 9, wherein each of the first links includes an associated resilient member disposed between the pair of first and second wedge stacks and biasing the pair of wedge stacks away from each other.

12. The clutch of claim 11, wherein the resilient members are coil springs that circumscribe the first links.

13. The clutch of claim 9, wherein the inner race defines a plurality of circular grooves that are axially spaced to match axial spacing of the wedges of the wedge stacks, wherein the grooves receive inner surfaces of the wedges therein.

14. The clutch of claim 13, wherein the outer race defines an inner cam surface, and wherein the wedges have outer surfaces that match with sections of the inner cam surface such that the wedge stacks nest with the inner cam surface when rotationally aligned with the sections and are urged radially inward to frictionally engage the grooves of the inner race when rotationally misalign with the sections.

15. The clutch of claim 9, wherein each of the wedge stacks further has spacers disposed between the wedges.

16. A clutch comprising:
an inner race having an outer circumferential surface defining at least one groove;
an outer race circumscribing the inner race, the outer race having an inner circumferential surface defining lobes and valleys to form an inner cam surface; and
a wedge chain radially disposed between the inner and outer races, the wedge chain including a plurality of wedges having inner edges disposed in the at least one groove and interconnected with links to encircle the inner race, each of the wedges having an outer surface that cooperates with the cam surface to increase friction between the wedge and the at least one groove in response to circumferential movement of the wedge towards a corresponding one of the lobes and to decrease friction between the wedge and the at least one groove in response to circumferential movement of the wedge towards a corresponding one of the valleys.

17. The clutch of claim 16, wherein each of the wedges is connected to two links, and the wedges and the links are attached to each other such that the wedges are pivotal and circumferentially movable relative to each other.

18. The clutch of claim 16, wherein the links includes a first type of links and a second type of links.

19. The clutch of claim 18, wherein the first type of links include resilient members.

* * * * *